July 31, 1956  C. E. CHURCH  2,756,960
VALVE

Filed Nov. 3, 1953  2 Sheets-Sheet 1

Carroll E. Church
INVENTOR.

BY Ranseler O. Wyatt
ATTORNEY

July 31, 1956  C. E. CHURCH  2,756,960
VALVE
Filed Nov. 3, 1953  2 Sheets-Sheet 2
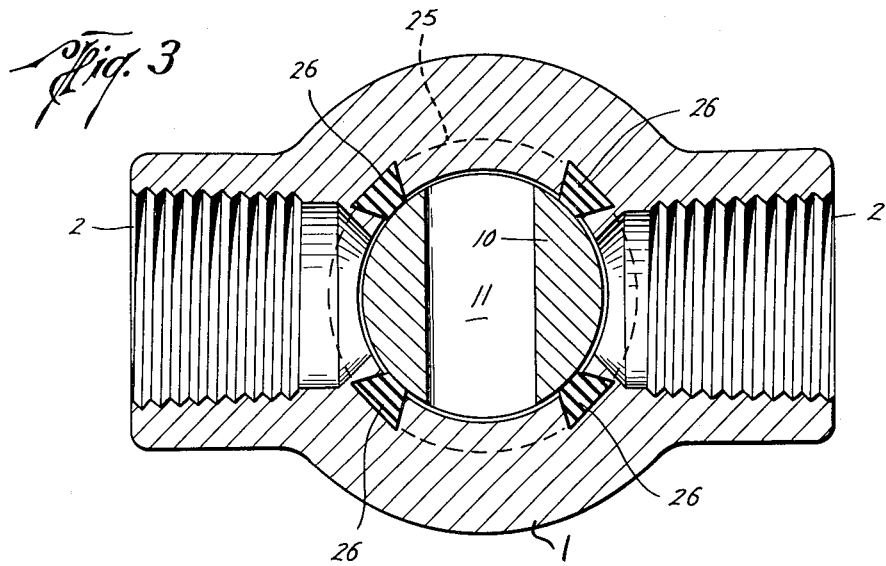
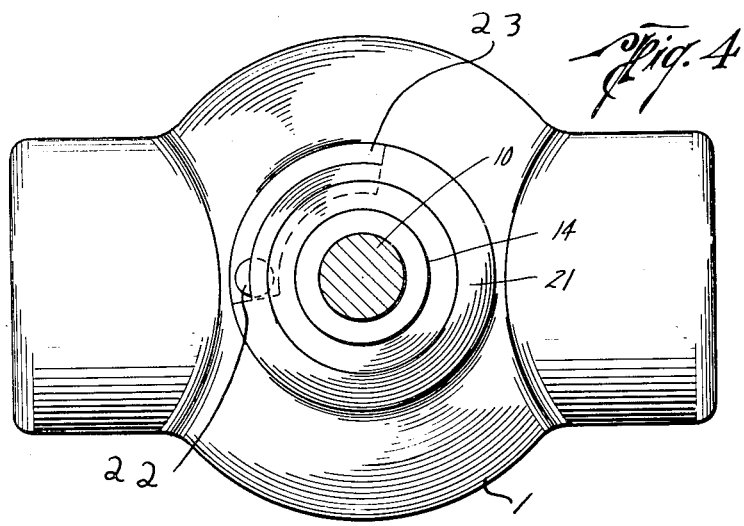
Carroll E. Church
INVENTOR.
BY
ATTORNEY United States Patent Office 2,756,960
Patented July 31, 1956

2,756,960

VALVE

Carroll E. Church, Houston, Tex.

Application November 3, 1953, Serial No. 389,986

3 Claims. (Cl. 251—161)

This invention relates to new and useful improvements in a valve.

It is an object of this invention to provide a valve for use in fluid conduits containing gritty materials, such as drilling mud and the like, having novel means for sealing the valve.

It is another object of the invention to provide a mud valve having novel means for increasing and decreasing pressure on the sealing means as the valve plug is moved into and out of open position.

It is still another object of the invention to provide a valve for fluid conduits having novel means for adjusting the pressure of the valve plug against the sealing means and maintaining said plug in the desired position in the valve housing.

With the above and other objects in view, the invention has particular relation to certain novel features of construction, operation and arrangement of parts more particularly described in the following specification, and illustrated in the accompanying drawings, wherein:

Figure 3 is an end view, in cross section, taken on the line 3—3 of Figure 1, and Figure 4 is an end view, taken on the line 4—4 of Figure 1.

Figure 1:
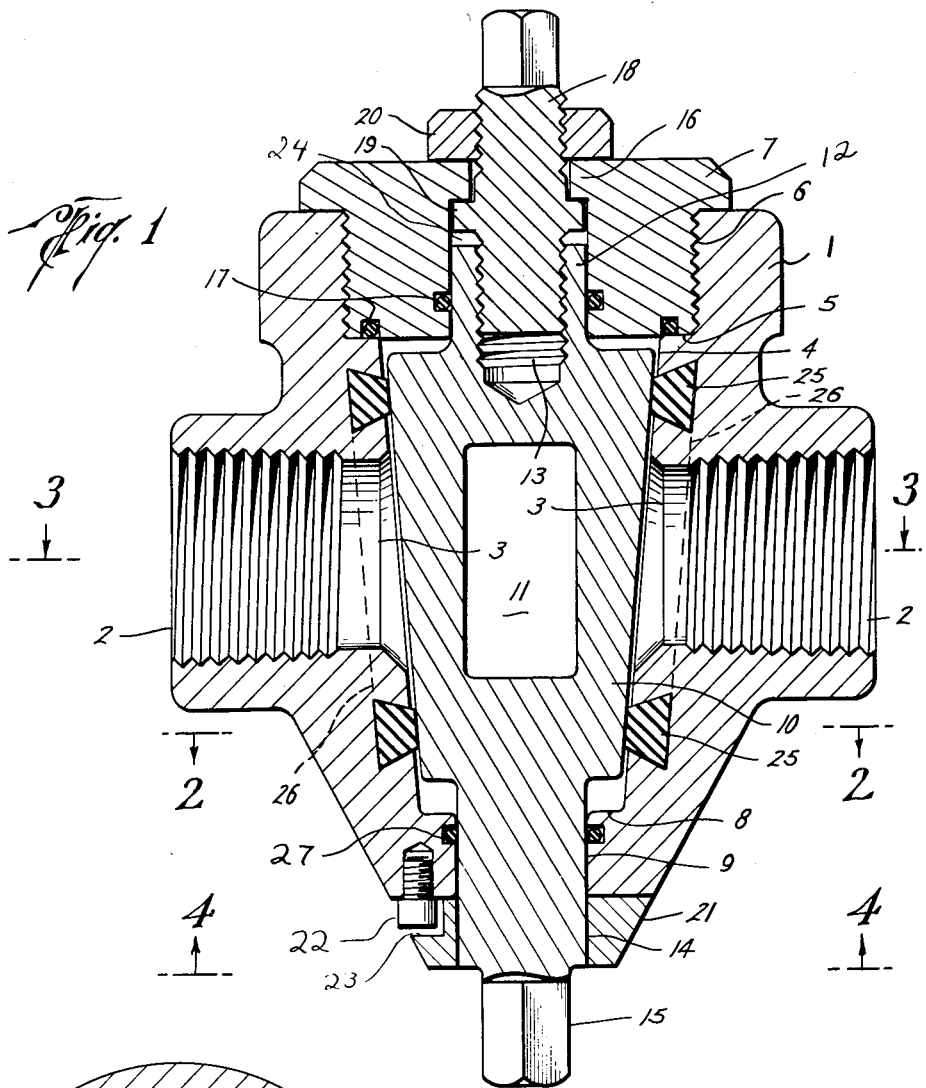
Figure 1 is a side elevational view, in cross section.
Figure 2:
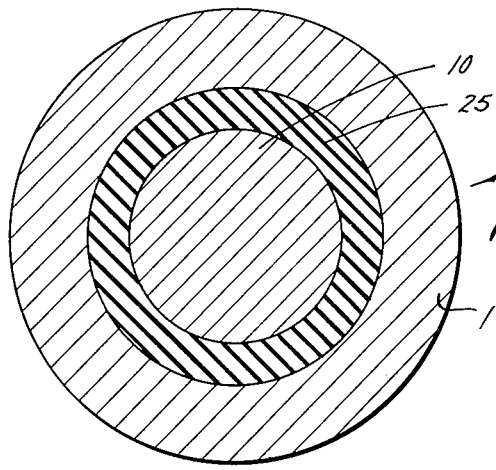
Figure 2 is an end view, in cross section, taken on the line 2—2 of Figure 1.

Referring now more particularly to the drawings, the numeral 1 designates a housing formed of suitable rigid material having the internally threaded conduit receiving ports 2, 2 which terminate in the outwardly flared ports 3, 3.

The housing 1 has the transverse tapered chamber 4 which is enlarged at one end forming the shoulder 5 and internally threaded as at 6 to receive the collar 7. Said chamber 4 is reduced at the opposite end, forming the shoulder 8 and the orifice 9.

A valve plug 10 having a port 11 extending transversely therethrough, formed of a rigid material, is shaped to fit in the chamber 4, having the side walls thereof tapered and having the reduced extension 12 at one end in which an internally threaded axial bore 13 is formed and having the opposing end 14 reduced to fit snugly in the orifice 9 and having suitable wrench receiving means 15 extending out of the housing 1.

Suitable sealing means, such as the groove and O-ring 27 may be provided in the inside face of the orifice 9 as an auxiliary sealing means.

The collar 7 is provided with the inwardly extended shoulder 16 and with suitable auxiliary sealing means, as the grooves and O-rings 17, 17.

An externally threaded adjusting member 18, having the flange 19 approximately midway its ends is adapted to be received by the internally threaded axial bore 13 in the plug 10. The flange 19 will abut against the shoulder 16 of the collar 7 and a suitable locking nut as 20 will anchor the member 18 in position in the collar 7.

A suitable retaining collar 21 may be welded to the extended end of the reduced portion 14 of the plug 10, outside of the housing 1. A suitable stop means, as the set screw 22 mounted in the housing 1, and the slot 23 in the collar 21, may be provided to limit the rotation of the plug 10, and may be aligned to place the port 11 in alignment with the ports 3, 3 when the screw 22 is at one extremity of the slot 23 and a ninety degree turn away from alignment with the said ports 3, 3, when at the other extremity of the slot 23.

Suitable wedge shaped slots are formed in the housing 1 in the face of the chamber 4 in which suitable sealing means formed of a relatively hard resilient material, such as neoprene, may be molded. The sealing means may be molded to form the annular seals 25, 25 and the longitudinal seals 26, 26 in a single integral mold, with the extended margins of the seals bearing against the plug 10.

When the plug 10 is inserted into the chamber 4, and the collar 7 secured in the housing 1, the plug 10 is adjusted to the desired position by means of the member 18 and the lock nut 20 moved into locking position to maintain the plug in the selected position, leaving sufficient distance between the end of the plug 10 and the inside face of the shoulder 19 to permit the quarter rotation of the plug 10. When the plug 10 is moved to open position, with the port 11 aligned with the ports 3, 3 the plug 10 moves upwardly on the member 18, the threads on the lower end of said member being of a counterpitch, as opposed to the pitch of the threads on the upper portion of the member 18, the threads on the upper portion being preferably standard right hand threads, and the threads of the lower portion being preferably left hand threads, so that the movement of the plug 10 into open position will not loosen the member 18 from the lock nut 20. When it is desired to again close the valve, the plug 10 is rotated by means of the wrench receiving member 15, in the opposite direction, until stopped by the stop means 22, and the plug 10 will travel downwardly in the chamber 4, increasing the pressure of the plug against the sealing means 25, 26.

The bore 24, in the collar 7, and the orifice 9 in the housing 1, form means for the axial alignment of the plug 10, the reduced ends 12, 14 being machined to fit snugly in said bore and orifice so that the flow pressure of the fluid flowing through the conduits 3, 3 will not tilt the plug 10, and thus disturb the uniformity of the pressure on the sealing means 25, 26, and permit the leakage of fluid past the sealing means.

While the foregoing is considered a preferred form of the invention, it is by way of illustration only, and the broad principle of the invention will be defined by the appended claims.

What I claim is:

1. In a valve, having means for increasing the pressure seal upon closing of the valve comprising a valve housing having a transverse flow port therethrough, means in said flow port for receiving a fluid conduit, a plug chamber in said housing having tapered side walls, a plug mounted in said chamber having a transverse flow port therethrough and having tapered side walls, the ends of said plug being reduced and extending through said housing, maintaining the plug in axial alignment annular and vertical integral resilient sealing means mounted in said chamber and bearing against said plug completely inclosing said flow port in said housing and plug, said plug having an internally threaded bore in one end, means for the vertical movement of said plug simultaneously with the opening and closing of the valve comprising an adjusting member having external threads pitched in one direction on one end and external threads pitched in the opposing direction on the other end and an annular flange between said threaded ends for the initial set of compression of the plug against said resilient sealing means, said member being mounted at one end in said internally threaded bore in said plug the other end extending through said housing, said flange bearing against the inside wall of said housing and having a locking nut at said extended end.

2. In a valve, a valve housing having a conical shaped plug chamber, a conical shaped plug in said chamber having a flow way therethrough, said plug having reduced axial extensions and having an actuating nut on one end and an internally threaded socket in the other end, an adjusting member mounted in said housing having oppositely directed threads at each end, one end of said nut extending into said socket in said plug and the other end of said adjusting member having a lock nut mounted thereon and a flange between said threaded ends which abuts the inside wall of said housing, integral vertical and annular resilient packing means mounted in said plug chamber completely inclosing said flowway and bearing against said plug.

3. In a valve, a valve housing, inlet and outlet ports in said housing, a plug chamber in said housing between said ports having tapered side walls, a tapered plug having a flowway therethrough mounted in said chamber, said plug having a reduced axial extension at each end, one of said extensions extending through the said housing and terminating in an actuating member, the other of said extensions having an internally threaded axial socket, an adjusting member mounted in said housing having an annular flange midway the respective ends thereof and having oppositely pitched external threads adjacent said flange, said adjusting member having one end extended into said socket and said flange bearing against the inside wall of said housing and a locking nut on the other end maintaining said member immovably mounted on said housing, said plug rotating in said housing to bring the flowway into and out of alignment with the inlet and outlet ports and moving vertically on said adjusting member as it rotates.

References Cited in the file of this patent

UNITED STATES PATENTS

| 21,237 | Winslow | Aug. 17, 1858 |
| 221,288 | Dewrance | Nov. 4, 1879 |
| 455,347 | Morrison | July 7, 1891 |
| 552,199 | Bratt | Dec. 31, 1895 |
| 950,382 | Farnan | Feb. 22, 1910 |
| 1,211,392 | Bolton | Jan. 9, 1917 |
| 1,765,139 | Dyck | June 17, 1930 |
| 2,615,672 | Hinrichs | Oct. 28, 1952 |

FOREIGN PATENTS

| 113,559 | Great Britain | of 1918 |
| 124,251 | Great Britain | of 1919 |